(12) United States Patent
Carnevali

(10) Patent No.: US 8,156,681 B2
(45) Date of Patent: Apr. 17, 2012

(54) FISHING ROD HOLDER

(76) Inventor: Jeffrey D. Carnevali, Seattle, WA (US)

(*) Notice: Subject to any disclaimer, the term of this patent is extended or adjusted under 35 U.S.C. 154(b) by 56 days.

(21) Appl. No.: 12/661,580

(22) Filed: Mar. 19, 2010

(65) Prior Publication Data

US 2011/0225870 A1    Sep. 22, 2011

(51) Int. Cl.
*A01K 97/10* (2006.01)
(52) U.S. Cl. ............................................. 43/21.2
(58) Field of Classification Search .............. 43/21.2; 248/511, 514–516, 520, 523, 534, 538, 540; *A01K 97/10*
See application file for complete search history.

(56) References Cited

U.S. PATENT DOCUMENTS

| | | | | | |
|---|---|---|---|---|---|
| 2,200,183 | A | * | 5/1940 | Legg | 248/538 |
| 2,682,127 | A | * | 6/1954 | Binder | 43/21.2 |
| 3,792,829 | A | * | 2/1974 | Fickett | 248/534 |
| 6,571,507 | B2 | * | 6/2003 | Elford | 43/21.2 |
| 7,406,795 | B1 | * | 8/2008 | Follmar | 43/21.2 |
| 2008/0155881 | A1 | * | 7/2008 | Carnevali | 43/21.2 |
| 2008/0256839 | A1 | * | 10/2008 | Follmar | 43/21.2 |

OTHER PUBLICATIONS

Down-East Sportscraft, Inc., How Do They Work? (http://www.down-east.com/works.htm), Aug. 5, 2008, accessed Jul. 27, 2011.*
Down-East Sportscraft, Inc., Bolt-On Rod Holders (http://www.down-east.com/bolt-on.htm), Aug. 5, 2008, accessed Jul. 27, 2011.*

* cited by examiner

*Primary Examiner* — Darren W Ark
*Assistant Examiner* — Kathleen Iwasaki
(74) *Attorney, Agent, or Firm* — Charles J. Rupnick Attorney at Law

(57) ABSTRACT

A novel quick release fishing rod holder, the fishing rod holder is a base portion forming a longitudinal tube having a curved entry thereinto; and a split-arm fishing rod retainer assembly, including a split-barrel portion formed of a cooperating pair of opposing semi-tubular walls split along a longitudinal opening therebetween, and a torque restraint mechanism operable between the opposing semi-tubular walls adjacent to opposing ends thereof, and a split-leg portion sized to be received into the tube of the base portion through the curved entry thereinto, wherein the split-leg portion includes a pair of legs each having one of the semi-tubular walls of the split-barrel portion positioned at a distal end thereof, and a curved insertion portion cooperating with the curved entry into the tube of the base portion. A biasing mechanism is positioned for biasing apart the walls of the split-barrel portion.

19 Claims, 7 Drawing Sheets

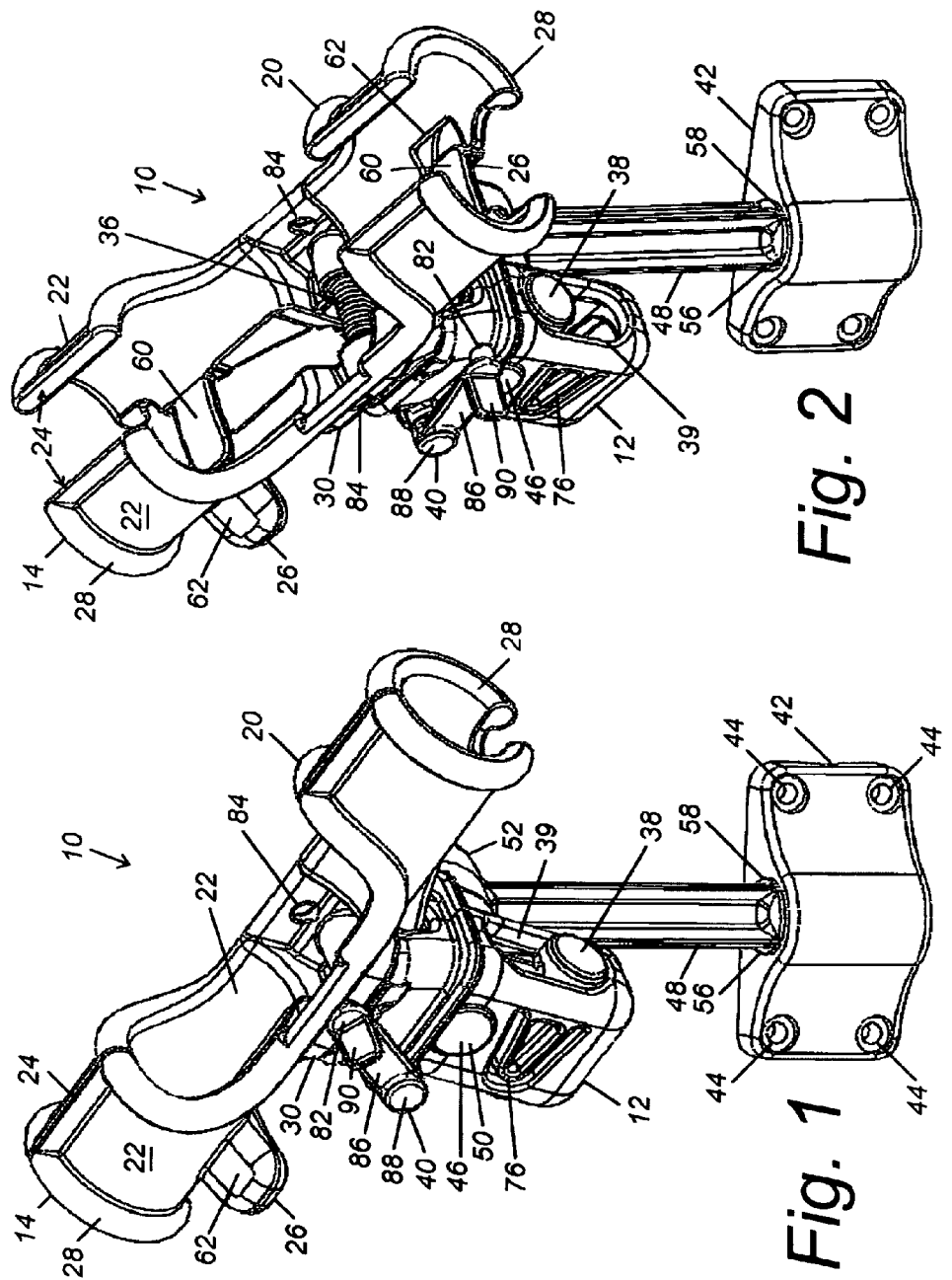

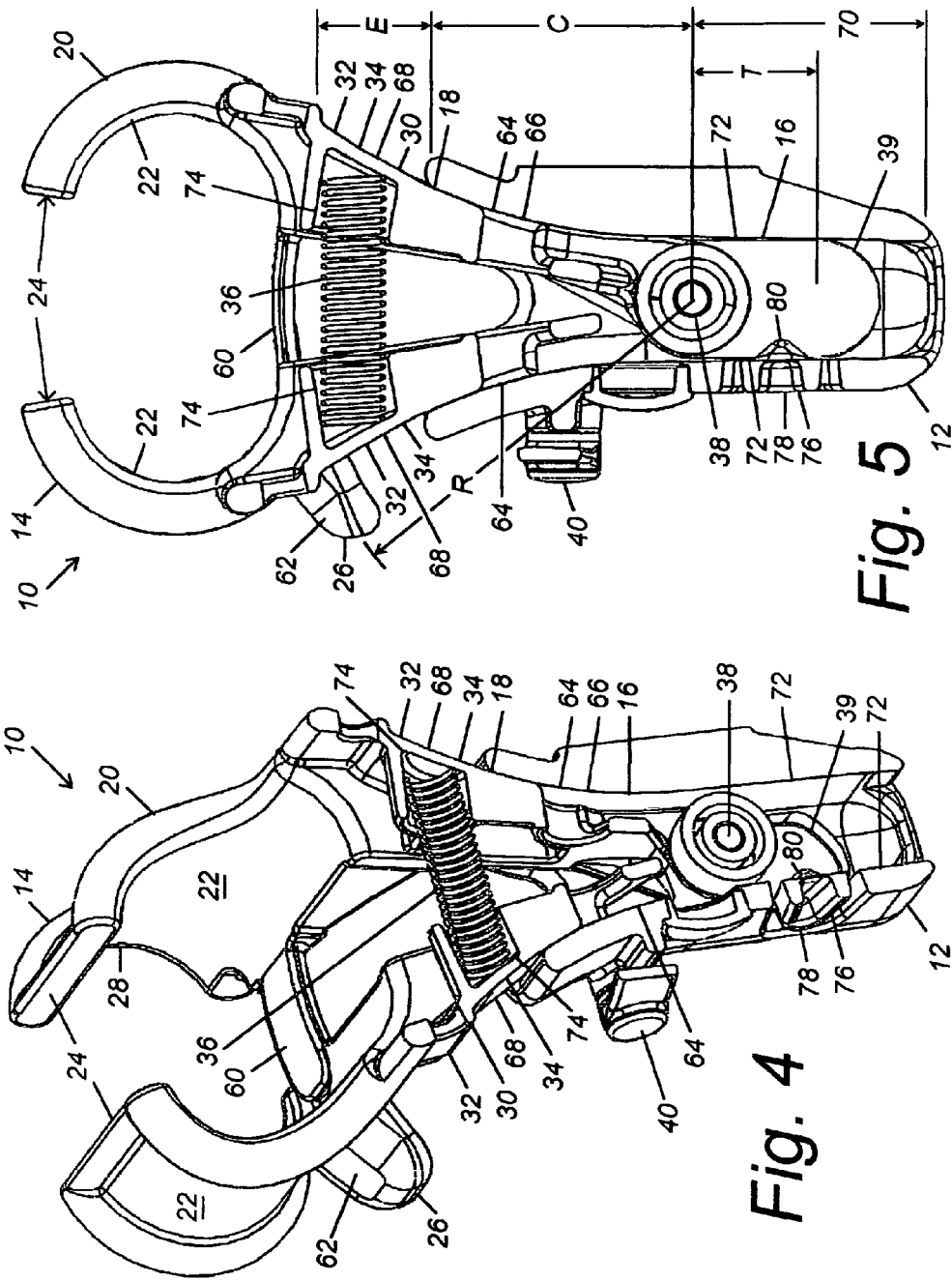

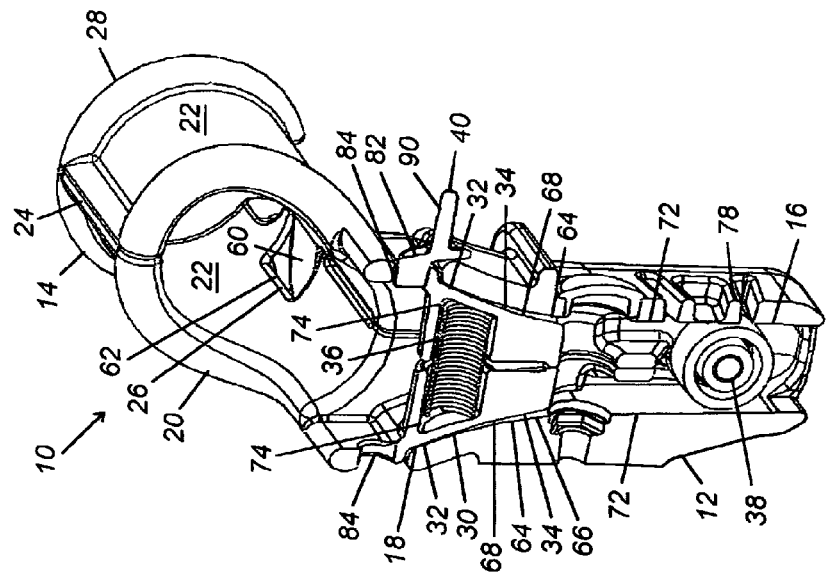
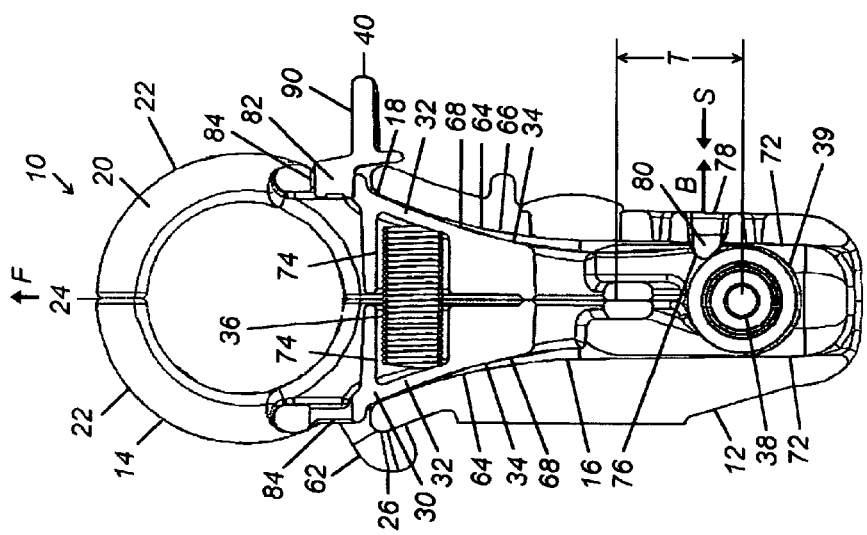

FISHING ROD HOLDER

FIELD OF THE INVENTION

The present invention relates generally to holders for holding fishing rods, and in particular to quick release fishing rod holders having a split-barrel portion operated by pulling away from a fitted base portion.

BACKGROUND OF THE INVENTION

Fishing rod holders are generally well-known. However, known quick release fishing rod holders are limited in their ability perform efficiently and effectively. One know fishing rod holder manufactured by Down-East Sportscraft, Inc., Lewiston, Me., provides rod tilt and rotation in a single mechanism, and also provides quick release by lifting upward on the rod, which lifts a pair of cooperating semi-conical legs out of a mating conical tube whereby the pair of semi-conical legs are able to separate and two arms joined to the semi-conical legs spread apart to release the fishing rod.

However, this and other known quick release fishing rod holders are limited in their ability to provide the above functions efficiently and reliably.

SUMMARY OF THE INVENTION

The present invention is a novel quick release fishing rod holder having a split-barrel portion operated by pulling away from a fitted base portion.

According to one aspect of the novel quick release fishing rod holder, the fishing rod holder is a base portion forming a longitudinal tube having a curved entry thereinto; and a split-arm fishing rod retainer assembly, including a split-barrel portion formed of a cooperating pair of opposing semi-tubular walls split along a longitudinal opening therebetween, and a torque restraint mechanism operable between the opposing semi-tubular walls adjacent to opposing ends thereof, and a split-leg portion sized to be received into the tube of the base portion through the curved entry thereinto, wherein the split-leg portion includes a pair of legs each having one of the semi-tubular walls of the split-barrel portion positioned at a distal end thereof, and a curved insertion portion cooperating with the curved entry into the tube of the base portion. A biasing mechanism is positioned for biasing apart the walls of the split-barrel portion.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 illustrates an exemplary fishing rod holder configured in a closed state for retaining a fishing rod therein;

FIG. 2 and FIG. 3 illustrate the exemplary fishing rod holder configured in an open state for inserting or removing a fishing rod thereinto or therefrom;

FIGS. 4 and 5 illustrate the exemplary fishing rod holder configured in the open state;

FIGS. 6 and 7 illustrate the exemplary fishing rod holder configured in the closed state;

DETAILED DESCRIPTION OF PREFERRED EMBODIMENT

In the Figures, like numerals indicate like elements.

Figure 3:
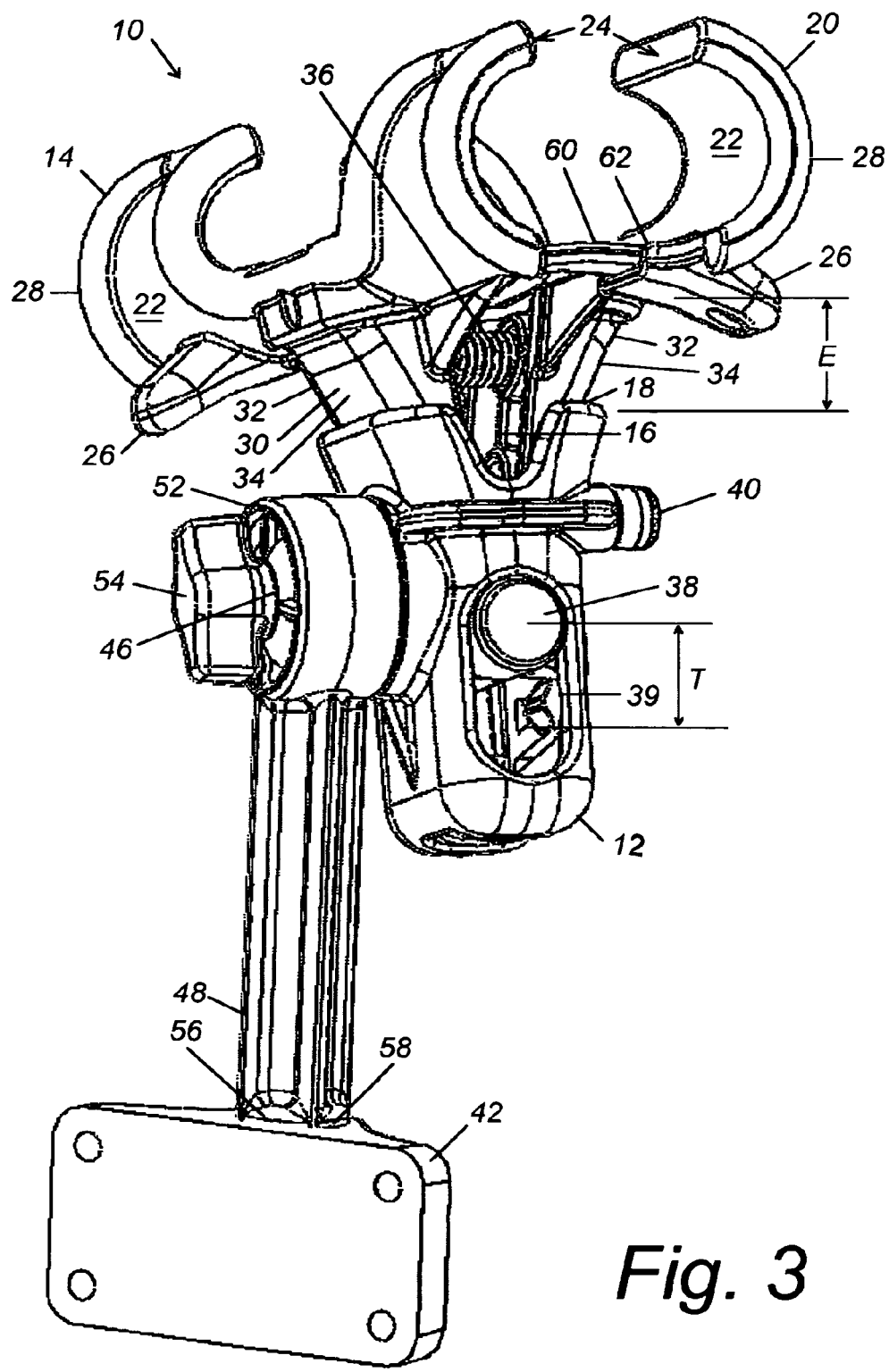

FIG. 1 illustrates one example of a fishing rod holder 10 configured in a closed state for retaining a fishing rod therein. FIG. 2 and FIG. 3 illustrate exemplary fishing rod holder 10 configured in an open state for inserting or removing a fishing rod thereinto or therefrom. Fishing rod holder 10 is formed by a base portion 12 and a split-arm fishing rod retainer assembly 14. Base portion 12 is formed of a longitudinal receiver tube 16 having an outwardly curved entry 18 leading thereinto.

Rod retainer assembly 14 includes an open-ended split-barrel portion 20 having a cooperating pair of opposing semi-tubular walls 22 split along a longitudinal opening 24 therebetween, and longitudinal opening 24 being maximized. A torque restraint mechanism 26 is operable between opposing semi-tubular walls 22 adjacent to opposing open ends 28 thereof. Rod retainer assembly 14 also includes a split-leg portion 30 sized to be received into tube 16 of base portion 12 through curved entry 18 thereinto. Split-leg portion 30 is formed of a pair of legs 32 each having one of semi-tubular walls 22 of split-barrel portion 20 positioned at a distal end thereof, and an outwardly curved insertion portion 34 matched to a curvature of curved entry 18 into receiver tube 16 of base portion 12.

A biasing mechanism 36 is positioned for biasing apart legs 32 of split leg portion 30. For example, biasing mechanism 36 is a compression spring positioned between legs 32 of split leg portion 30 adjacent to semi-tubular walls 22 of split-barrel portion 20. Biasing mechanism 36 biases apart legs 32 of split leg portion 30 when rod retainer assembly 14 is extended on split leg portion 30 from entry 18 of longitudinal receiver tube 16, as illustrated in FIGS. 2 and 3. An optional hinge mechanism 38 is operable between legs 32 of split leg portion 30 distal from semi-tubular walls 22 of split-barrel portion 20. Hinge mechanism 38, when present, further operates as a means for rotating the one of cooperating legs 32 relative to the other leg 32, the hinge mechanism 38 means for rotating being positioned distal from clamp arms (semi-tubular walls 22) of split-barrel portion 20. Hinge mechanism 38, when present, further interacts with base portion 12 for limiting a throw T of split leg portion 30 within longitudinal receiver tube 16, whereby extension E of rod retainer assembly 14 relative to tube entry 18. For example, hinge mechanism 38 resides in a slot 39 formed in base portion 12 that limits travel of split leg portion 30 as shown in FIG. 3.

Optionally, a positive locking mechanism 40 is operational between base portion 12 and split-barrel portion 20 of rod retainer assembly 14 for securing the rod retainer assembly 14 in a closed state with longitudinal opening 24 between opposing semi-tubular walls 22 being minimized.

Fishing rod holder 10 also includes a support portion 42 structured for being mounted on an external surface, such as a gunwale of a boat via attachment points 44. An interlockable pivot mechanism 46 is provided between base portion 12 and support portion 42. For example, pivot mechanism 46 is interlockable relative to one end of a support post or axle 48 distal from gunwale support portion 42. Here, pivot mechanism 46 is a pivot or axle 50 in a hub 52 positioned adjacent to the distal end of support post 48. A clamping mechanism 54 coupled to axle 50 fixes base portion 12 relative to distal end of support post 48.

A 360 degree rotation mechanism 56 is provided between base portion 12 and support portion 42 and operated substantially perpendicular to interlockable pivot mechanism 46. For example, 360 degree rotation mechanism 56 is a mating bearing 58 receiving a proximal end of support post or axle 48.

FIGS. 4 and 5 illustrate exemplary fishing rod holder 10 configured in an open state for inserting or removing a fishing rod thereinto or therefrom. Here, torque restraint mechanism 26 is illustrated as a substantially rigid tongue 60 matable with a sheath 62. Tongue 60 and sheath 62 are formed opposite ones of opposing semi-tubular walls 22, with tongue 60 extended between opposing semi-tubular walls 22 adjacent to opposing open ends 28 thereof and sheath 62 formed opposite from tongue 60. Both tongue 60 and sheath 62 are curved to match radial distance R from hinge 38.

An internal configuration of base portion 12 and relationship with split leg portion 30 of rod retainer assembly 14 are more clearly illustrated here. Longitudinal receiver tube 16 is formed with opposing outwardly curved internal walls 64 defining an internally curved throat portion 66. Opposing outwardly curved internal walls 64 defining internally curved throat portion 66 extend from lead-in entry 18 into longitudinal receiver tube 16 a distance C that is substantially equal to or greater than extension E of rod retainer assembly 14 relative to tube entry 18. Internally curved throat portion 66 may extend to slot 39 formed in base portion 12 that limits travel of split leg portion 30 as shown in FIG. 3.

Similarly, insertion portions 34 of legs 32 are defined by curved outer walls 68 that extend from semi-tubular walls 22 of split-barrel portion 20 the same distance C of curvature of internally curved throat portion 66. Curved outer walls 68 defining insertion portions 34 are formed with a matching curvature cooperating with internally curved throat portion 66 for smoothly expanding semi-tubular walls 22 as split-barrel portion 20 is extended from curved entry 18 of longitudinal receiver tube 16. As illustrated here, curvatures of internally curved throat portion 66 and curved outer walls 68 of matching curved insertion portions 34 of legs 32 are cooperating large radii. Cooperating curves of internally curved throat portion 66 and matching curved insertion portions 34 of legs 32 ensure that semi-tubular walls 22 of split-barrel portion 20 spread quickly upon extension from entry 18 of receiver tube 16, and further ensure that longitudinal opening 24 therebetween is maximized in the shortest extension distance E of rod retainer assembly 14 relative to tube entry 18.

Prior art devices utilized mating conical receiver tube and insertion portion of the split-arm fishing rod retainer. Accordingly, the receiver tube of the prior art was a funnel shape, and the legs of the prior art split-arm fishing rod retainer were a matching cone shape. In operation of the prior art device, the outer walls of the cone shaped legs followed the internal walls of the funnel shaped receiver tube in a linear fashion such that the opening therebetween expanded at a linear rate as a function of the incline of the matching cone and funnel shapes.

In contrast, curved outer walls 68 of curved insertion portions 34 of legs 32 follow outwardly curved internal walls 64 of internally curved throat portion 66 of longitudinal receiver tube 16 in a radial fashion. This radial relationship between the cooperating curvature of internally curved throat portion 66 and matching curved insertion portions 34 of legs 32 actually accelerates expansion of longitudinal opening 24 between opposing semi-tubular walls 22 of split-barrel portion 20, as illustrated here. This accelerated expansion and maximization of longitudinal opening 24 within a minimal extension E of rod retainer assembly 14 relative to tube entry 18 distinguishes fishing rod holder 10 from the prior art.

Internally curved throat portion 66 blends tangentially into a straight or slightly tapered portion 70 of longitudinal receiver tube 16 distal from curved entry 18 and communicates therewith. Distal portion 70 of longitudinal receiver tube 16 is formed of substantially planar internal walls 72 oppositely inclined slightly outwardly toward curved entry 18. The slight incline of internal tube walls 72 is eases release from a mold for when base portion 12 is molded as, for example, from plastic.

Spring of biasing mechanism 36 is compressed between tubular retainer slots 74 formed in legs 32 of split leg portion 30 adjacent to semi-tubular walls 22 of split-barrel portion 20. Accordingly, expansion of biasing mechanism 36 between opposing semi-tubular walls 22 operatively urges split-barrel portion 20 to split along longitudinal opening 24 when rod retainer assembly 14 is extended on split leg portion 30 from entry 18 of longitudinal receiver tube 16. Furthermore, compression of biasing mechanism 36 operatively urges expansion of longitudinal opening 24 between opposing semi-tubular walls 22, which in turn urges extension of split leg portion 30 from entry 18 of longitudinal receiver tube 16. Accordingly, introduction of compression spring biasing mechanism 36 between opposing legs 32 of split leg portion 30 operatively urges extension of rod retainer assembly 14 from longitudinal receiver tube 16 when split leg portion 30 is released from base portion 12, as disclosed herein.

FIGS. 6 and 7 illustrate exemplary fishing rod holder 10 configured in a closed state for retaining a fishing rod therein. Here, split leg portion 30 when rod retainer assembly 14 is retracted within longitudinal receiver tube 16 of base portion 12. Spring biasing mechanism 36 is compressed within tubular retainer slots 74 between opposing legs 32 of split leg portion 30 of rod retainer assembly 14. Spring biasing mechanism 36 is thus in a state for urging extension of rod retainer assembly 14 from longitudinal receiver tube 16 of base portion 12, as disclosed herein. Such expansive urging of biasing mechanism 36 is overcome by a passive retainer mechanism 76 operative between rod retainer assembly 14 and base portion 12. Passive retainer mechanism 76 is positioned to resist transition of rod retainer assembly 14 from the closed state to the open state. For example, hinge mechanism 38 is interlocked with a movable spring arm 78 having a blunt nose portion 80 that intrudes into longitudinal receiver tube 16 of base portion 12 and interferes with rod retainer assembly 14, for example, interfering with a portion of hinge 38 as illustrated. Retainer mechanism 76 thus effectively constrains rod retainer assembly 14 to remain retracted within longitudinal receiver tube 16 of base portion 12 unless overcome by a force F applied to split-barrel portion 20 pulling rod retainer assembly 14 outwardly of receiver tube 16 of base portion 12. For example, force F may be applied by a user attempting to remove a fishing pole from fishing rod holder 10. Sufficient force F applied to split-barrel portion 20 of rod retainer assembly 14 overcomes spring force S of spring arm 78 directed inwardly of base portion 12. Sufficient pulling force F overcoming spring force S causes movable spring arm 78 to bend (arrow B) sideways outwardly of base portion 12, whereby blunt nose portion 80 thereof is pushed outwardly of receiver tube 16 and out of interference with hinge 38. Thereafter, rod retainer assembly 14 extends smoothly from base portion 12, which extension is operatively urged by expansion of compression spring biasing mechanism 36 between opposing legs 32 for driving split leg portion 30 from longitudinal receiver tube 16. A spring force of movable spring arm 78 is optimized to ensure ease of release of rod retainer assembly 14 extends smoothly from base portion 12, whereby a minimal force F is effective for releasing rod retainer assembly 14.

Passive retainer mechanism 76 is operable for retaining rod retainer assembly 14 relative to base portion 12 against unintentional application of forces. However, unintentional application of pulling force F applied to split-barrel portion 20 may overcome passive retainer mechanism 76 inadvertently releasing rod retainer assembly 14 and a fishing rod retained therein. Therefore, positive locking mechanism 40 is operable for ensuring retention of rod retainer assembly 14 relative to base portion 12 against unintentional forces. For example, positive locking mechanism 40 is a detent 82 sized to be received into a hole 84 in one of opposing semi-tubular walls 22 of split-barrel portion 20 of rod retainer assembly 14. Semi-tubular walls 22 of split-barrel portion 20 are substantially identical such that hole 84 is provided in each of the pair. By example and without limitation, detent 82 is carried on an arm 86 rotatably coupled to base portion 12 via a pivot pin 88. A handle 90 is optionally provided for manipulating positive locking mechanism 40 between a locked position having detent 82 positively engaged with hole 84 in wall 22, and an unlocked position having detent 82 disengaged from hole 84.

Figure 9:
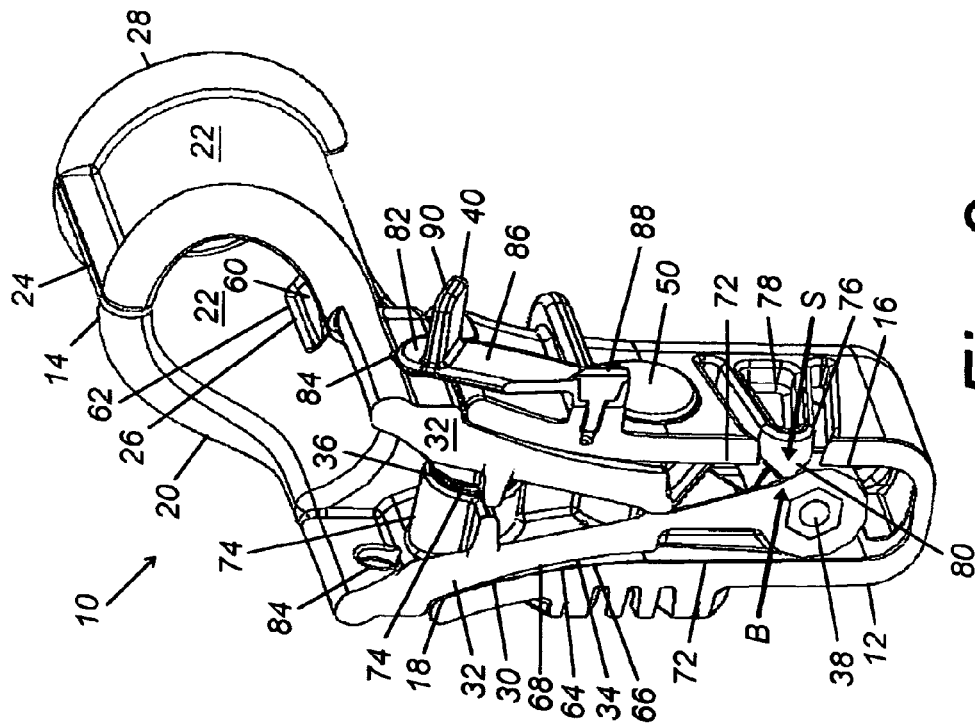
FIG. 8 and FIG. 9 more clearly illustrate a positive locking mechanism.
Figure 8:
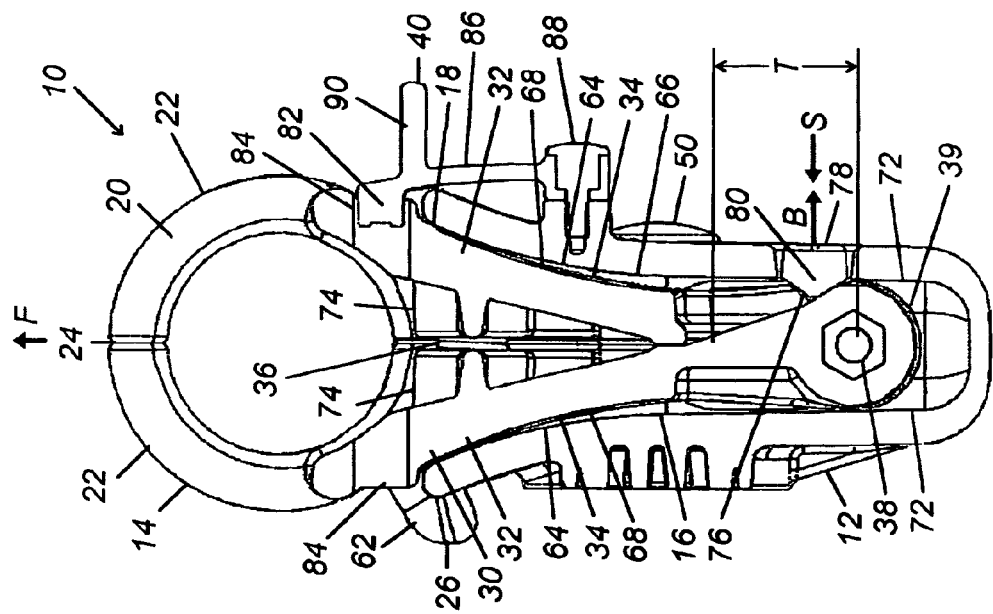

FIG. 8 and FIG. 9 more clearly illustrate positive locking mechanism 40 between rod retainer assembly 14 relative to base portion 12. Detent 82 is rotatable on arm 86 between the locked position (shown here) of positive locking mechanism 40 and its unlocked position. Accordingly, when present optional handle 90 is operated to rotate arm 86 on pivot pin 88 between the locked position having detent 82 engaged with hole 84 in one of opposing semi-tubular walls 22 of split-barrel portion 20 of rod retainer assembly 14, and the unlocked position having detent 82 disengaged from hole 84. When engaged in the positively locked position, locking mechanism 40 positively constrains rod retainer assembly 14 relative to base portion 12 with split leg portion 30 retracted into receiver tube 16.

Figure 10:
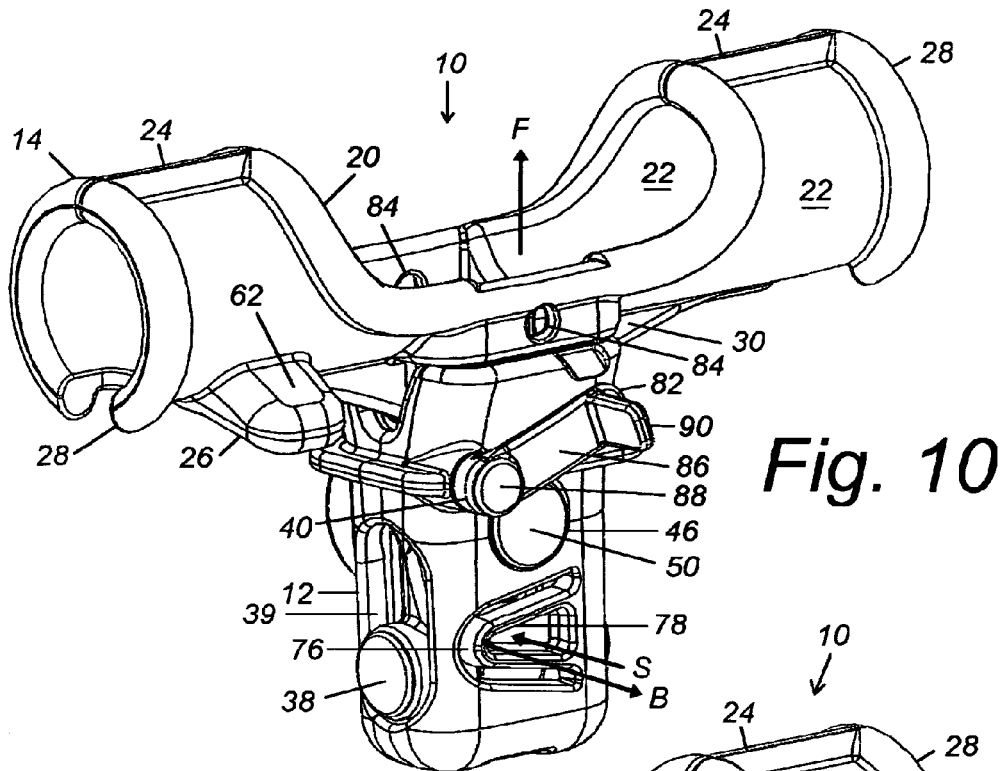
FIG. 10 and FIG. 11 illustrates the exemplary fishing rod holder in the closed state.

FIG. 10 illustrates exemplary fishing rod holder 10 in the closed state with positive locking mechanism 40 in its unlocked position and passive retainer mechanism 76 engaged with hinge mechanism 38 for constraining rod retainer assembly 14 relative to base portion 12. Accordingly, as disclosed herein, sufficient force F applied to split-barrel portion 20 of rod retainer assembly 14 overcomes spring force S of spring arm 78 and bends it (arrow B) outwardly of base portion 12, whereby blunt nose portion 80 thereof is dislocated outwardly of receiver tube 16 and out of interference with hinge 38. Split leg portion 30 is thereby released within receiver tube 16, and rod retainer assembly 14 extends smoothly from base portion 12.

Figure 11:
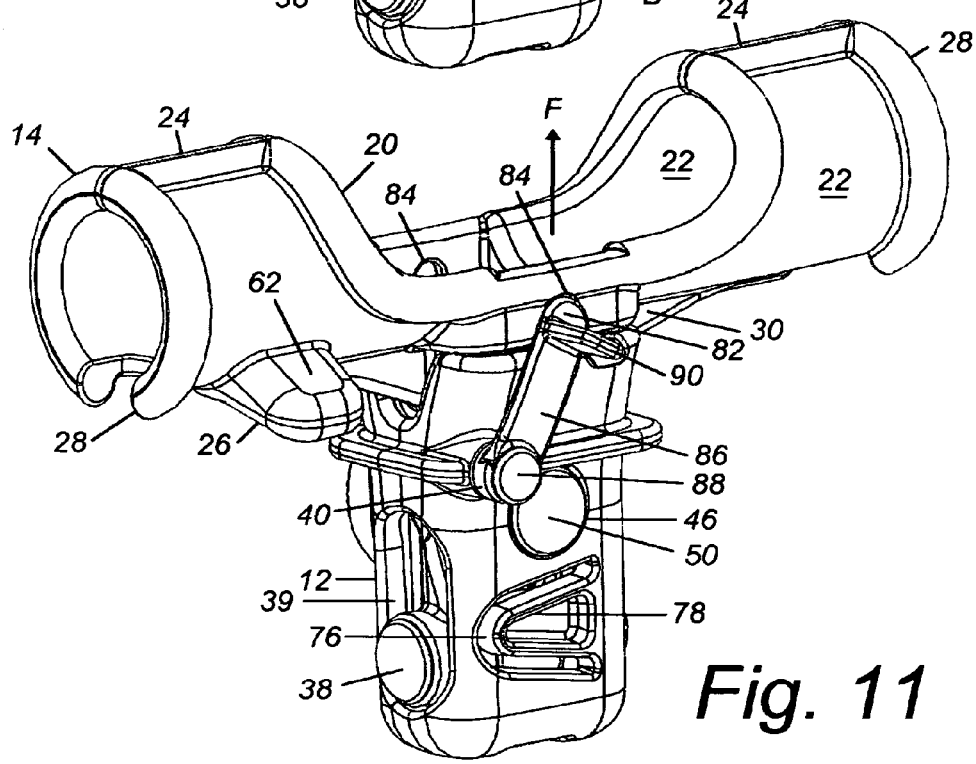

FIG. 11 illustrates exemplary fishing rod holder 10 in the closed state with positive locking mechanism 40 and its locked position between rod retainer assembly 14 and base portion 12. Thus, detent 82 is positively engaged with hole 84 in wall 22 of split-barrel portion 20. This positive engagement of locking mechanism 40 ensures that virtually no amount of force F applied to split-barrel portion 20 of rod retainer assembly 14 is sufficient to pull rod retainer assembly 14 outwardly of base portion 12. Accordingly, a fishing rod is expected be retained in fishing rod holder 10 during normal operation and use.

Figure 12:
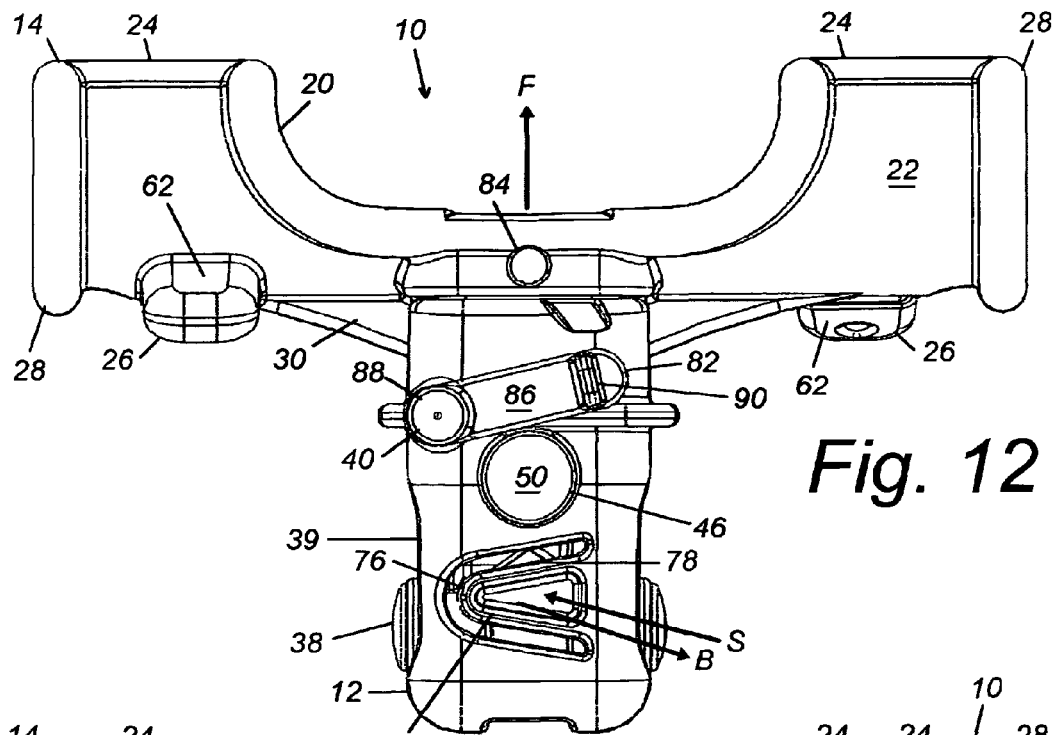
FIG. 12 is a side view of the exemplary fishing rod holder in the closed state.

FIG. 12 is a side view illustrating exemplary fishing rod holder 10 in the closed state with positive locking mechanism 40 and its unlocked position between rod retainer assembly 14 and base portion 12.

Figure 13:
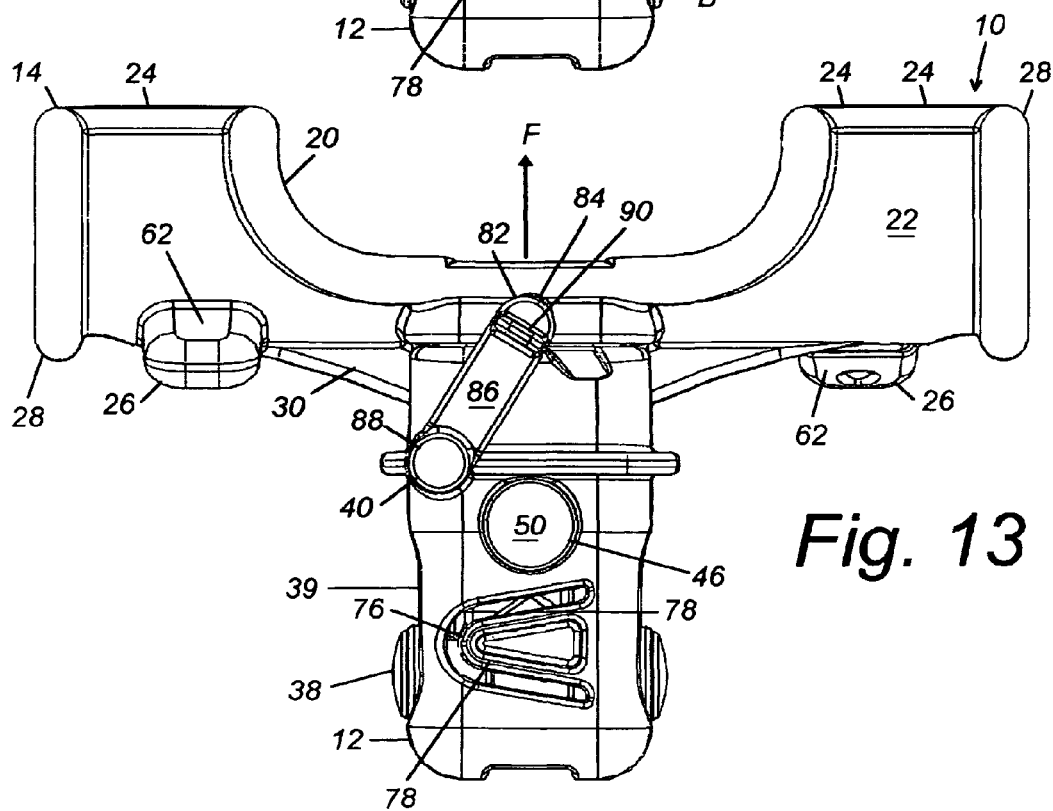
FIG. 13 is another side view of the exemplary fishing rod holder in the closed state.

FIG. 13 is a side view illustrating exemplary fishing rod holder 10 in the closed state with positive locking mechanism 40 and its locked position between rod retainer assembly 14 and base portion 12.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A fishing rod holder, comprising:
   a base portion comprising a longitudinal tube having a curved entry thereinto;
   a split-arm fishing rod retainer assembly, comprising:
      a split-barrel portion comprising a cooperating pair of opposing semi-tubular walls split along a longitudinal opening therebetween, and a torque restraint mechanism operable between the opposing semi-tubular walls adjacent to opposing ends thereof,
      and a split-leg portion sized to be received into the tube of the base portion through the curved entry thereinto, wherein the split-leg portion further comprises a pair of legs each having one of the semi-tubular walls of the split-barrel portion positioned at a distal end thereof, and a curved insertion portion cooperating with the curved entry into the tube of the base portion; and
   a biasing mechanism positioned for biasing apart the walls of the split-barrel portion.

2. The fishing rod holder of claim 1, wherein the biasing mechanism further comprises a spring positioned between the legs of the split leg portion.

3. The fishing rod holder of claim 2, wherein the fishing rod retainer assembly further comprises a hinge mechanism structured between the legs of the split-leg portion distal from the split-barrel portion.

4. The fishing rod holder of claim 3, wherein the tube of the base portion further comprises a tapered portion distal from the curved entry and communicating therewith, the distal tapered portion further comprising substantially planar walls oppositely inclined outwardly toward the curved entry.

5. The fishing rod holder of claim 4, further comprising a support portion structured for being mounted on an external surface; and
   a rotation mechanism between the base portion and the support portion.

6. The fishing rod holder of claim 5, wherein the rotation mechanism further comprises an axle in a mating bearing.

7. The fishing rod holder of claim 5, further comprising a locking mechanism operational between the base portion and the split arm rod retainer assembly for securing the split arm rod retainer assembly in a closed state with the longitudinal opening being minimized between the pair of opposing semi-tubular walls of the split-barrel portion.

8. The fishing rod holder of claim 5, wherein the curved entry into the tube of the base portion further comprises a pair of radii extended oppositely outwardly of the longitudinal tube; and
   wherein the curved insertion portion of the split-leg portion further comprises a pair of radii extended oppositely outwardly and matched to the radii of the curved entry into the tube of the base portion.

9. A fishing rod holder, comprising:
a base portion comprising a longitudinal tube comprising a pair of opposing outwardly curved internal walls defining an internally curved throat portion therebetween and communicating with an opening thereinto; and
a split-arm fishing rod retainer assembly, comprising:
a cooperating pair of opposing clamp arms structured to cooperate with the base portion, each clamp arm comprising:
a leg portion sized to be received into the curved throat portion of the longitudinal tube of the base portion and further comprising a curved outer wall comprising a curvature cooperating with the internally curved throat portion, and
a semi-tubular wall portion coupled to the leg portion adjacent to the curved outer wall thereof and further comprising one of a cooperating pair of opposing semi-tubular walls forming a semi-tubular barrel split along a longitudinal opening between the semi-tubular walls;
a torque restraint mechanism positioned between the opposing semi-tubular walls opposite from the longitudinal opening therebetween and adjacent to opposing ends thereof,
a hinge between the leg portions distal from the semi-tubular wall portions, and
a biasing mechanism between the leg portions adjacent to the semi-tubular wall portions.

10. The fishing rod holder of claim 9, wherein the split-arm fishing rod retainer assembly is further operable between a closed state having the leg portions refracted into the tube of the base portion and compressed together against the biasing mechanism and the longitudinal opening being minimized between the pair of opposing semi-tubular wall portions of the pair of cooperating clamp arms for forming the semi-tubular barrel therebetween, and
an open state having the leg portions partially extended from the tube opening of the base portion and spaced apart with the biasing mechanism expanded therebetween and the longitudinal opening being maximized between the pair of opposing semi-tubular wall portions of the pair of cooperating clamp arms for expanding the semi-tubular barrel.

11. The fishing rod holder of claim 10, wherein the pair of opposing outwardly curved internal walls of the base portion defining the internally curved throat portion therebetween further comprises a first pair of opposing radii; and
wherein the curvature of the curved outer wall of the leg portion of the split-arm fishing rod retainer assembly cooperating with the internally curved throat portion of the base portion further comprises a second pair of opposing radii selected to slidingly engage the first pair of radii during operation of the split-arm fishing rod retainer assembly between the open state and the closed state.

12. The fishing rod holder of claim 11, wherein the torque restraint mechanism further comprises a radially curved tongue portion and a cooperating receiver sheath that is radially curved to receive thereinto the radially curved tongue portion.

13. The fishing rod holder of claim 11, wherein the base portion further comprises a passive retainer mechanism positioned to resist transition of the split-arm fishing rod retainer assembly from the closed state to the open state.

14. The fishing rod holder of claim 11, further comprising a positive locking mechanism that is operational between the base portion and the split-arm fishing rod retainer assembly for securing the split-arm fishing rod retainer assembly in the closed state.

15. A fishing rod holder, comprising:
a split-arm fishing rod retainer assembly, comprising:
a plurality of cooperating clamp arms structured to form a semi-tubular barrel that is spreadable along a longitudinal opening and being operable between a closed state having the longitudinal opening being minimized between the clamp arms for forming the semi-tubular barrel therebetween, and an open state having the longitudinal opening being maximized between the pair of cooperating clamp arms for expanding the semi-tubular barrel, and
a plurality of cooperating leg portions extended from the clamp arms;
a base portion structured to receive the leg portions extended from the clamp arms;
means for sliding at least one of the leg portions in a radial motion relative to the base portion between the closed and open states;
means for resisting torque between the plurality of cooperating clamp arms, the torque resisting means being positioned opposite from the longitudinal opening therebetween;
means for urging the split-arm fishing rod retainer assembly toward the open state; and
means for mounting the split-arm fishing rod retainer assembly on an external surface.

16. The fishing rod holder of claim 15, wherein the sliding means further comprises:
a tube formed in the base portion, the tube being structured to receive the plurality of cooperating leg portions thereinto, the tube being formed with one or more outwardly radially curved internal walls; and
an outer wall formed on one or more of the plurality of cooperating leg portions, the outer wall being radially curved to cooperate with the one or more outwardly radially curved internal walls of the tube of the base portion for slidingly engaging therewith between the closed and open states.

17. The fishing rod holder of claim 16, further comprising means for rotating the one of the plurality of cooperating leg portions relative to a different one thereof, the means for rotating being positioned distal from the clamp arms.

18. The fishing rod holder of claim 16, further comprising means for passively resisting transition from the closed state to the open state.

19. The fishing rod holder of claim 18, further comprising means for positively interlocking the split-arm fishing rod retainer assembly with the base portion for securing the closed state.

* * * * *